United States Patent
Kim

(10) Patent No.: US 9,391,679 B2
(45) Date of Patent: *Jul. 12, 2016

(54) VARIABLE SIZE CODEBOOK FOR MIMO SYSTEM

(71) Applicant: MARVELL WORLD TRADE LTD., St. Michael (BB)

(72) Inventor: Kyungho Kim, Santa Clara, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/330,942

(22) Filed: Jul. 14, 2014

(65) Prior Publication Data

US 2014/0321569 A1 Oct. 30, 2014

Related U.S. Application Data

(63) Continuation of application No. 13/523,018, filed on Jun. 14, 2012, now Pat. No. 8,781,019, which is a continuation of application No. 12/053,430, filed on Mar. 21, 2008, now Pat. No. 8,259,835.

(60) Provisional application No. 60/896,374, filed on Mar. 22, 2007.

(51) Int. Cl.
*H04B 7/04* (2006.01)
*H04B 7/06* (2006.01)
*H04L 25/03* (2006.01)
*H04L 27/26* (2006.01)

(52) U.S. Cl.
CPC ............ *H04B 7/0456* (2013.01); *H04B 7/0417* (2013.01); *H04B 7/065* (2013.01); *H04B 7/0639* (2013.01); *H04L 25/03343* (2013.01); *H04L 27/2626* (2013.01); *H04L 2025/03802* (2013.01)

(58) Field of Classification Search
None
See application file for complete search history.

(56) References Cited

U.S. PATENT DOCUMENTS

| 7,599,332 | B2 | 10/2009 | Zelst et al. |
| 7,742,390 | B2 | 6/2010 | Mujtaba |
| 7,751,495 | B1 | 7/2010 | Palanivelu et al. |
| 7,764,673 | B1 * | 7/2010 | Asawa et al. ............... 370/389 |
| 8,259,835 | B2 | 9/2012 | Kim |

(Continued)

FOREIGN PATENT DOCUMENTS

| EP | 1234426 A2 | 8/2002 |
| EP | 1732245 A2 | 12/2006 |
| WO | WO-2006076213 A1 | 7/2006 |

OTHER PUBLICATIONS

Second Office Action in CN Application No. 200880009398.8, dated May 2, 2013.

(Continued)

*Primary Examiner* — Leon-Viet Nguyen

(57) ABSTRACT

In a method of selecting a codebook for precoding a wireless transmission signal, a characteristic of a wireless communication channel is measured, and a codebook size is selected using (i) an expected throughput for each of a plurality of different codebook sizes given the measured characteristic of the wireless communication channel, and (ii) channel overhead associated with each of the plurality of different codebook sizes. Based on matrix selection criteria, a best matrix is selected from a codebook of the selected codebook size, and an indicator of the selected matrix is transmitted.

20 Claims, 5 Drawing Sheets

(56) References Cited

U.S. PATENT DOCUMENTS

| | | | |
|---|---|---|---|
| 8,619,907 B2 | 12/2013 | Mujtaba et al. | |
| 8,781,019 B2* | 7/2014 | Kim | 375/267 |
| 2006/0270360 A1 | 11/2006 | Han et al. | |
| 2006/0287743 A1* | 12/2006 | Sampath et al. | 700/90 |
| 2007/0049218 A1 | 3/2007 | Gorokhov et al. | |
| 2007/0098106 A1 | 5/2007 | Khojastepour et al. | |
| 2007/0217540 A1 | 9/2007 | Onggosanusi et al. | |
| 2007/0297529 A1 | 12/2007 | Zhou et al. | |
| 2010/0202553 A1 | 8/2010 | Kotecha et al. | |
| 2011/0122971 A1 | 5/2011 | Kim et al. | |

OTHER PUBLICATIONS

Third Office Action in CN Application No. 200880009398.8, dated Nov. 21, 2013.
First Office Action in TW Application No. 097110430, dated Oct. 17, 2013.
Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band, IEEE P802.11g/D8.2 (Apr. 2003).
Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band, IEEE P802.11g/D2.8 (May 2002).
TGn Sync Proposal Technical Specification, IEEE P802.11 Wireless LANs, Abstract (2005).
Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 5 GHz Band, IEEE Std 802.11 a (1999).
Zhou et al., "BER Criterion and Codebook Construction for Finite-Rate Precoded Spatial Multiplexing with Linear Receivers," IEEE Trans. on Signal Processing, vol. 54, No. 5, pp. 1653-1665 (2006).
Gesbert et al., "From Theory to Practice: An Overview of MIMO Space-Time Coded Wireless Systems," IEEE J. on Selected Areas in Communications, vol. 21, No. 3, pp. 281-302 (Apr. 2003).
Love et al., "Limited Feedback Precoding for Spatial Multiplexing Systems," Proceedings of IEEE GLOBECOM 2003, pp. 1857-1861 (2003).
"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., Sep. 2007.
Office Action in Chinese Application No. 200880009398.8, dated Jun. 4, 2012.
International Search Report and Written Opinion in International Application No. US2008/005794, dated Nov. 19, 2008 (6 pages).
International Preliminary Report on Patentability International Application No. US2008/005794, dated Sep. 22, 2009 (6 pages).
Communication Pursuant to Article 94(3) EPC in European Application No. 08 744 204.Feb. 1851, dated Jul. 7, 2015 (6 pages).
IEEE Std P802.11-REVma/06.0, (Revision of IEEE Std 802.11-1999) "Unapproved Draft Standard for Information Technology-Telecommunications and information exchange between systems-Local and metropolitan area network-Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).
IEEE Std 802.16e-2005 and IEEE Std 802.16/2004/Cor1-2005 (Amendment and Corrigendum to IEEE Std 802.16/2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, pp. 1-864 (Feb. 28, 2006).
Ansari et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).
Chen, "Home Network Basis: Transmission Environments and Wired/Wireless Protocols," *Prentice Hall*, pp. 1-26 (Jul. 2003).
Mujtaba, "IEEE P802.11—Wireless LANs, TGn Sync Proposal Technical Specification," *The Institute of Electrical and Electronics Engineers, Inc.*, doc.: IEEE 802.11—04/0889r6, pp. 1-131 (May 2005).
van Nee et al. "The 802.11n MIMO-OFDM Standard for Wireless LAN and Beyond," Wireless Personal Communications, vol. 37, pp. 445-453 (Jun. 2006).

* cited by examiner

VARIABLE SIZE CODEBOOK FOR MIMO SYSTEM

CROSS-REFERENCE TO RELATED APPLICATION

The present application is a continuation application of U.S. application Ser. No. 13/523,018, now U.S. Pat. No. 8,781,019, entitled "Variable Size Codebook for MIMO System," filed on Jun. 14, 2012, which is a continuation of U.S. application Ser. No. 12/053,430, now U.S. Pat. No. 8,259,835, entitled "Variable Codebook for MIMO System," filed Mar. 21, 2008, which claims priority to U.S. Provisional Patent Application No. 60/896,374, entitled "Variable Codebook for MIMO System," which was filed on Mar. 22, 2007. All of the applications referenced above are hereby incorporated by reference in their entireties.

FIELD OF TECHNOLOGY

The present disclosure relates generally to wireless communication systems and, more particularly, to a system and method for precoding wireless transmissions using a variable size codebook.

BACKGROUND

An ever-increasing number of relatively cheap, low power wireless data communication services, networks and devices have been made available over the past number of years, promising near wire speed transmission and reliability. Various wireless technologies are described in detail in the 802.11 IEEE Standard, including for example, the IEEE Standard 802.11a (1999) and its updates and amendments, the IEEE Standard 802.11g (2003), 3GPP LTE, as well as the IEEE Standard 802.11n now in the process of being adopted, all of which are collectively incorporated herein fully by reference. These standards have been or are in the process of being commercialized with the promise of 54 Mbps or more effective throughput such as 100 Mbps, making them a strong competitor to traditional wired Ethernet and the more ubiquitous "802.11b" or "WiFi" 11 Mbps mobile wireless transmission standard.

In general, transmission systems compliant with the IEEE 802.11a and 802.11g or "802.11a/g," 802.16 or 3GPP LTE, as well as the 802.11n standards achieve high data transmission rates using Orthogonal Frequency Division Modulation or OFDM encoded symbols and using quadrature amplitude modulation (QAM) on the OFDM sub-bands. In a general sense, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Transmitters used in the wireless communication systems that are compliant with the 802.11a/802.11g/802.11n standards as well as other standards such as the 3GPP LTE and 802.16a IEEE Standard, typically perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the 802.11a/802.11g/802.11n, 3GPP LTE and 802.16a IEEE standards typically include an RF receiving unit that performs RF downconversion and filtering of the received signals (which may be performed in one or more stages), and a baseband processor unit that processes the OFDM encoded symbols bearing the data of interest. The digital form of each OFDM symbol presented in the frequency domain is recovered after baseband downconverting, conventional analog to digital conversion and Fast Fourier Transformation of the received time domain signal. Thereafter, the baseband processor performs demodulation and frequency domain equalization (FEQ) to recover the transmitted symbols, and these symbols are then processed with an appropriate FEC decoder, e.g. a Viterbi decoder, to estimate or determine the most likely identity of the transmitted symbol. The recovered and recognized stream of symbols is then decoded, which may include deinterleaving and further error correction using any of a number of known error correction techniques, to produce a set of recovered signals corresponding to the original signals transmitted by the transmitter.

To further increase the number of signals which may be propagated in the communication system and/or to compensate for deleterious effects associated with the various propagation paths, and to thereby improve transmission performance, it is known to use multiple transmission and receive antennas within a wireless transmission system. Such a system is commonly referred to as a multiple-input, multiple-output (MIMO) wireless transmission system and is specifically provided for within the 3GPP LTE and the 802.11n IEEE Standard now being adopted. The use of MIMO technology produces significant increases in spectral efficiency, throughput, and link reliability. These benefits generally increase as the number of transmission and receive antennas included in the MIMO system increases.

In particular, in addition to the frequency channels created by the use of OFDM, a MIMO channel formed by the various transmission and receive antennas between a particular transmitter and a particular receiver includes a number of independent spatial channels. A wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

In MIMO wireless communication systems, the RF modulated signals transmitted by the transmit antennas may reach the various receive antennas via a number of different propagation paths, the characteristics of which typically change over time due to the phenomena of multi-path and fading. Moreover, the characteristics of the various propagation sub-channels differ or vary based on the frequency of propagation. To compensate for the time varying, frequency selective nature of these propagation effects, and generally to enhance effective encoding and modulation in a MIMO wireless communication system, and improve the overall system throughput, the receiver of the MIMO wireless communication system may periodically develop or collect channel state information (CSI) for the wireless channel between the transmitter and receiver. Generally, the wireless channel comprises a composite channel in which the effects of all combinations of transmit antennas and receive antennas are taken into account. A channel matrix may be created comprising a plurality of complex channel values representing the channel characteristics (for example, the gain, the phase and the SNR of each channel) between each transmit-receive antenna pair. Upon determining the CSI for the composite channel, the receiver may send the CSI, or other information derived from the CSI, back to the transmitter, which may use the CSI or other information derived from the CSI, to precondition or precode the signals transmitted over channel so as to compensate for the varying propagation effects of the channels.

A precoding matrix may be developed which when multiplied with the transmitted signal negates the propagation effects of the channel. However, because the propagation effects of the wireless channel vary over time, a single precoding matrix will only be sufficient to compensate for one set of channel characteristics. Separate precoding matrices must be developed to compensate for different sets of channel characteristics. A plurality of precoding matrices may be derived in advance in order to compensate for a range of different channel conditions. The plurality of precoding matrices may be assembled in a codebook which may be stored in a memory associated with the transmitter. Upon measuring the CSI, the receiver in a MIMO wireless communication system may determine which of the precoding matrices in the codebook is most appropriate to compensate for the measured CSI. The receiver may transmit a precoding matrix index or other identifier back to the transmitter specifying which precoding matrix in the codebook should be used to precode signals to be transmitted over the channel. The transmitter may then precode signals using the specified precoding matrix.

The size of the codebook, i.e. the number of precoding matrices included in the codebook, can have a significant impact on system throughput and overall channel efficiency. With a large codebook having many precoding matrices to choose from, it is possible to select a precoding matrix which closely matches (i.e. counteracts) the measured propagation effects of the channel. By accurately counter-acting the propagation effects of the channel system throughput can be significantly improved. However, a larger codebook requires a larger amount of data to be fed back from the receiver to the transmitter in order to identify a particular precoding matrix to be used for precoding transmitted signals. The additional feedback data required of a large codebook consumes additional channel overhead and has a negative impact on channel efficiency. Under certain conditions, such as a channel with a high SNR, the improved system throughput associated with a large codebook may be worth the cost in added overhead. In other cases, such as a poor quality channel with a low SNR, the improved system throughput, even with a large codebook, may not justify the cost in increased channel overhead. When designing a codebook for a MIMO wireless communication system there is a tension between creating a large codebook with the possibility of significant improvements in system throughput under favorable conditions and creating a smaller codebook which will consume less channel overhead, and will not diminish system throughput when channel conditions are less than ideal.

SUMMARY OF THE DISCLOSURE

The present disclosure generally relates to the use of a variable size codebook within a MIMO wireless communication system. The size of the codebook may be determined by the quality of the wireless transmission channel between the transmitter and receiver, for example, or some other codebook selection criteria. In some circumstances, it may be preferable to employ a larger codebook when the channel quality is high, allowing for significant gains in overall same system throughput. On the other hand, a smaller codebook may be preferable in circumstances when the channel quality is poor, so that the added channel overhead associated with a larger code book does not reduce the channel efficiency. For example, a smaller codebook may be preferable when a larger codebook would not significantly improve system throughput.

In one embodiment, a method of selecting a codebook for precoding a wireless transmission signal includes measuring a characteristic of a wireless communication channel, and selecting a codebook size using (i) an expected throughput for each of a plurality of different codebook sizes given the measured characteristic of the wireless communication channel, and (ii) channel overhead associated with each of the plurality of different codebook sizes. The method also includes selecting, based on matrix selection criteria, a best matrix from a codebook of the selected codebook size, and transmitting an indicator of the selected matrix.

In another embodiment, an apparatus comprises channel state information measuring circuitry, and a codebook selector. The codebook selector is configured to (a) select a size of a codebook using (i) an expected throughput for each of a plurality of different codebook sizes given a measured characteristic of the wireless communication channel measured by the channel state information circuitry, and (ii) channel overhead associated with each of the plurality of different codebook sizes. A codebook corresponding to the selected size includes precoding matrices for precoding signals to be sent to a communication device. The codebook selector is also configured to (b) select a best matrix from a codebook of the selected codebook size based on matrix selection criteria. The apparatus also comprises a transmitter configured to transmit an indicator of the selected matrix.

DETAILED DESCRIPTION

Figure 1:
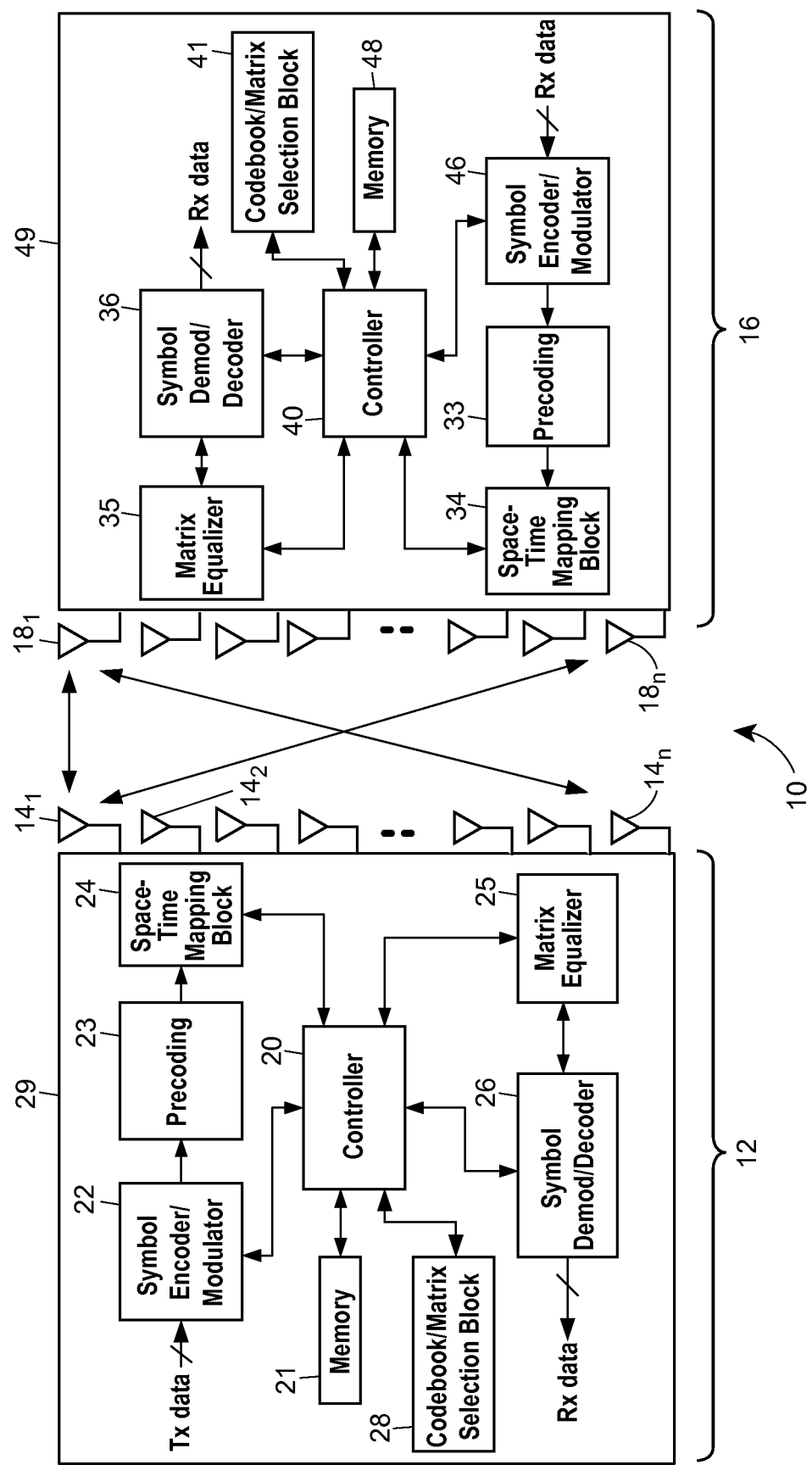
FIG. 1 is a block diagram of a wireless MIMO communication system that employs a variable size codebook for precoding wireless transmission signals.

The present disclosure generally relates to variable sized codebooks for use in precoding data streams to be transmitted in multiple-input-multiple-output (MIMO) wireless communication systems. The transmission characteristics of the wireless channel between the transmitter and receiver of a MIMO wireless communication system change over time. If the transmitter has a priori knowledge of the channel characteristics, signals may be preconditioned (precoded) to compensate in advance for the negative effects of transmitting the signals over the wireless channel. Under favorable conditions precoding signals in this manner can significantly improve channel throughput.

In a MIMO wireless communication system the communication channel may be represented as a matrix of complex channel values that represent the transmission effects of all combinations of the transmitting and receiving antennas. A precoding matrix may be derived which counteracts the negative effects of transmitting signals over the wireless communication channel. A signal may be multiplied by the precoding matrix before transmission over the wireless communication channel. Upon receiving such precoded signals the receiver has a much better chance of recovering the original signal, notwithstanding the negative effects of the wireless channel. Precoding signals in this manner can significantly improve system throughput.

Since the channel characteristics change over time, a finite number of precoding matrices may be derived in advance, each matrix adapted to compensate for a particular set of channel characteristics. The plurality of precoding matrices may be collected into a codebook and stored at the transmitter. Upon measuring the existing channel characteristics an appropriate precoding matrix may be selected from the codebook and applied to a signal before the signal is transmitted over the wireless communication channel.

Typically, channel state information (CSI) is calculated at the receiver based on a known signal transmitted from the transmitter to the receiver. The CSI is fed back to the transmitter and the transmitter chooses an appropriate precoding matrix for precoding subsequent signals from the codebook. Alternatively, the receiver may have knowledge of the codebook and the receiver itself may be adapted to select an appropriate precoding matrix from the codebook. In this case, the receiver feeds back a precoding matrix index or other identifier to the transmitter that specifies the appropriate precoding matrix for precoding signals to be sent from the transmitter to the receiver given the channel conditions observed by the receiver.

If the codebook is large, containing many different precoding matrices for addressing a large number of different channel conditions, a precoding matrix may be selected which is closely paired to the characteristics of the wireless channel in order to achieve the greatest possible improvement in system throughput. If the codebook is small, it will be less likely that the precoding matrix will precisely compensate for the negative effects of the channel characteristics. Therefore, with a smaller codebook the improvement in channel throughput may not be as dramatic as with a larger codebook. However, a larger codebook requires greater specificity to identify the appropriate precoding matrix for a given set of channel conditions. The greater specificity required of a larger codebook requires more data, either in the form of a longer matrix index identifier or more detailed CSI, to be fed back from the receiver to the transmitter than would otherwise be the case if a smaller codebook were employed. The additional channel overhead required of a larger codebook can reduce overall channel efficiency. Thus, there are tradeoffs that may be considered when selecting the size of the codebook.

Another factor to consider when selecting the size of the codebook is the state of the channel at the time the signals are transmitted. In some cases, for example when the channel exhibits a high signal to interference-plus-noise-ratio (SINR), accurate precoding of the signals may result in dramatically improved channel throughput. In other cases, such as when the SINR is low, precoding results may be marginal at best. When channel conditions warrant, it may be desirable to have a large codebook containing a large number of precoding matrices to choose from so that the maximum gains in channel throughput may be realized. On the other hand, when channel conditions are such that the positive effects of precoding will be limited, a smaller codebook with a more limited number of precoding matrices may be employed in order to reduce channel overhead.

Because of the increased cost in channel overhead associated with a larger codebook, a larger codebook may be more effective in situations in which the gain in channel throughput associated with the use of the larger codebook outweighs the cost in channel overhead. In other cases a smaller codebook may be more appropriate. Because the wireless channel conditions change over time, there may be times when a larger codebook is more beneficial and other times when a smaller codebook is more appropriate. Unfortunately, the channel conditions typically cannot be known in advance. It is difficult to determine whether the improved system performance associated with a large codebook will justify the cost in channel overhead, or whether a smaller codebook should be employed. A solution is to use a variable size codebook, employing a more limited set of precoding matrices when channel conditions are such that the expected gains in system throughput associated with the use of a larger codebook may not justify the cost in increased channel overhead, and expanding the selection of available precoding matrices (i.e., using a larger codebook) when the channel conditions are such that the expected gains in system throughput may exceed the penalty paid in additional overhead.

Referring now to FIG. 1, a MIMO communication system 10 is illustrated in block diagram form. The MIMO communication system 10 generally includes a single transmitter 12 having multiple transmission antennas $14_1$-$14_N$ and a single receiver 16 having multiple receiver antennas $18_1$-$18_M$. In an embodiment of a MIMO wireless communication system the transmitter 12 may actually be a base station capable of both transmitting signals to one or more remote terminals. The receiver 16 may in turn be one such remote terminal, capable of receiving signals transmitted from the base station as well as transmitting signals back to the base station 12. Though both the base station and the terminal may be capable of both transmitting and receiving signals, the base station will be referred to herein as the transmitter 12 and the terminal will be referred to as the receiver 16. The number of transmission antennas $14_1$-$14_N$ can be the same as, more than, or less than the number of receiver antennas $18_1$-$18_M$. As shown in FIG. 1, the transmitter 12 may include a controller 20 coupled to a memory 21, a symbol encoder/modulator unit 22, a precoding block 23, a space-time mapping block 24, and a codebook selection block 28. The transmitter 12 may also include a matrix equalizer 25 and a symbol demodulator and decoder unit 26 to perform demodulation and decoding of signals received via the antennas 141-14N in a receive mode.

The controller 20 may be any desired type of controller and the controller 20 and the codebook/matrix selection block 28 may be implemented as one or more standard multi-purpose, programmable processors, such as a general purpose microprocessor, a digital signal processor, an application specific integrated circuit (ASIC), etc., or may be implemented using any other desired types of hardware, software and/or firmware. Likewise, the precoding block 23, the space-time mapping block 24, and the matrix equalizer 25 may be implemented using known or standard hardware and/or software elements. If desired, various of the transmitter components, such as the controller 20, the symbol encoder/modulator unit 22, the symbol demodulator/decoder unit 26, the codebook/ matrix selection block 28, the precoding block 23, the space-time mapping block 24 and the matrix equalizer 25 may be implemented in the same or in different hardware devices, such as in the same or different processors. Additionally, each of these components of the transmitter 12 may be disposed in a housing 29 (shown in dotted relief in FIG. 1) and the routines or instructions for implementing the functionality of any of these components may be stored in the memory 21 or within other memory devices associated with the individual hardware used to implement these components.

A variable size codebook may be stored in the memory 21. The variable-size codebook may be implemented in a number of different ways. For example, the variable size codebook may comprise a single fixed size codebook including a large number of pre-calculated precoding matrices. Smaller codebooks of differing sizes may be constructed from subsets of the plurality of precoding matrices found in the fixed size codebook. For example, a fixed size codebook having sixty-four precoding matrices may be stored in the memory 21. A second smaller codebook having only thirty-two precoding matrices may be created by selecting every other matrix found in the larger sixty-four matrix fixed size codebook. Similarly, a third codebook of sixteen matrices may be created by selecting every fourth matrix from the larger fixed size codebook. A codebook of eight matrices may be created by selecting every eighth matrix from the larger fixed size codebook, and a codebook of just four matrices may be created by selecting every sixteenth matrix from the larger fixed size codebook. Of course, these are just examples of the manner in which smaller codebooks may also be generated from a larger fixed size codebook. Codebooks comprising other subsets of a larger fixed size codebook may also be employed. Another alternative is to simply store a plurality of different size codebooks. For example, a first codebook having sixty-four precoding matrices may be stored in the memory 21. A second separate codebook having thirty-two precoding matrices may also be stored in the memory 21. A third codebook having 16 precoding matrices, a fourth codebook having eight precoding matrices and a fifth codebook having just four precoding matrices may also be stored separately in the memory 21.

One or more pre-calculated or predetermined spreading matrices may also be stored in the memory 21 and used in the spreading matrix block 24 at various times or under various different conditions. Thus, for example, a different pre-calculated or predetermined space-time mapping matrix may be stored for each of a number of possible combinations of encoded spatial streams of data to be transmitted and transmission antennas 14 to be used to simultaneously transmit these encoded spatial streams of data. Thus, for example, a different space-time mapping matrix may be calculated and stored for two spatial streams of data being sent via three of the transmission antennas 14, for two spatial streams of data being sent via four of the transmission antennas 14, for three spatial streams of data being sent via five transmission antennas 14, etc. In this manner, the communication system 10 may optimally send different numbers of spatial streams of data at different times, depending on the load of the system. Moreover, the communication system 10 may also use these various different pre-stored or pre-calculated space-time mapping matrices to account for or to adapt to the loss of one or more of the transmission antennas 14 to be used in sending data within the communication system 10.

During operation, information signals $Tx_1$-$Tx_n$ which are to be transmitted from the transmitter 12 to the receiver 16 are provided to the symbol encoder/modulator unit 22 for encoding and modulation. Of course, any desired number of signals $Tx_1$-$Tx_n$ may be provided to the modulator unit 22, with this number generally being limited by the modulation scheme employed by and the bandwidth associated with the MIMO communication system 10. Additionally, the signals $Tx_1$-$Tx_n$ may be any type of signals, including analog or digital signals, and may represent any desired type of data or information. Additionally, if desired, a known test or control signal $Cx_1$ (which may be stored in the memory 21) may be provided to the symbol encoder and modulator unit 22 for use in determining CSI related information describing the characteristics of the channel(s) between the transmitter 12 and the receiver 16. If desired, the same control signal or a different control signal may be used to determine the CSI for each frequency sub-band and/or spatial channel used in the MIMO communication system 10.

The symbol encoder and modulator unit 22 may interleave digital representations of the various signals $Tx_1$-$Tx_n$ and $Cx_1$ and may perform any other known type(s) of error-correction encoding on the signals $Tx_1$-$Tx_n$ and $Cx_1$ to produce one or more encoded streams of symbols $SS_1$, $SS_2$, ... $SS_p$, to be modulated and sent from the transmitter 12 to the receiver 16. While the symbol streams $SS_1$-$SS_p$ may be modulated using any desired or suitable QAM technique, such as using 64 QAM, these symbols may be modulated in any other known or desired manner including, for example, using any other desired phase and/or frequency modulation techniques. In any event, the modulated encoded symbol streams $SS_1$-$SS_p$ are provided by the symbol encoder and modulator unit 22 to the precoding block 23. The individual symbols comprise vectors which may be multiplied by the appropriate precoding matrix in the precoding block 23. The controller 20 receives a feedback signal from the receiver 16 which is used by the controller 20 to identify an appropriate precoding matrix stored in the variable size codebook stored in the memory 21. The controller 20 accesses the variable size codebook stored in the memory 21 and retrieves a precoding matrix appropriate for the channel characteristics and conditions prevailing at the time and provides the selected precoding matrix to the precoding block 23. The precoding block 23 multiplies the modulated encoded symbol streams $SS_1$-$SS_p$ by the selected precoding matrix, then provides the precoded symbol streams to the space-time mapping block 24 for processing before being transmitted via the antennas $14_1$-$14_N$. While not specifically shown in FIG. 1, the precoded modulated symbol streams $SS_1$-$SS_p$ may be processed by the space-time mapping block 24 that implements a space-time mapping matrix optionally in accordance with a transmission technique disclosed in co-pending U.S. patent application Ser. No. 11/851,237 entitled "Equal Power Output Spatial Spreading Matrix For Use In A MIMO Communication System," filed Sep. 6, 2007, the entire disclosure of which is incorporated herein by reference, before being up-converted to the RF carrier frequencies associated with an OFDM technique (in one or more stages). Upon receiving the modulated signals, the space-time mapping block 24 processes the modulated signals by injecting delays and/or gains into the modulated signals based on a space-time mapping matrix which may be provided by, for example, the controller 12, to thereby perform mixing and transmission of the spatial streams of data across the transmission antennas $14_1$-$14_N$.

The signals transmitted by the transmitter 12 are detected by the receiver antennas $18_1$-$18_M$ and may be processed by a matrix equalizer 35 within the receiver 16 to enhance the reception capabilities of the antennas $18_1$-$18_M$. A symbol demodulator and decoder unit 36, under control of the controller 40, may decode and demodulate the received symbol strings $SS_1$-$SS_p$ as recovered by the matrix equalizer 35. In this process, these signals may be downconverted to baseband. Generally, the demodulator and decoder unit 36 may operate to perform demodulation on the received symbols in each symbol stream $SS_1$-$SS_p$ to produce a digital bit stream for each symbol stream. In some cases, if desired, the symbol demodulator and decoder unit 36 may perform error correction decoding and deinterleaving on the bit stream to produce the received signals $Rx_1$-$Rx_n$ corresponding to the originally transmitted signals $Tx_1$-$Tx_n$.

The MIMO wireless communication system 10 may also provide a reverse channel whereby signals may be transmitted from the receiver 16 back to transmitter 12. Thus, as shown in FIG. 1, the receiver 16 may also include a memory 48, a symbol encoder and modulator unit 46, a precoding block 33, and a space-time mapping block 34. The symbol encoder/modulator 46 may receive one or more signals $TR_1$-$TR_m$. The signals $TR_1$-$TR_m$ may be encoded and modulated by the symbol encoder/modulator 46 using any desired encoding and modulation techniques. The memory 48 optionally may store a variable size codebook similar to that stored in the transmitter memory 21. The controller 40 may access the memory 48 to retrieve an appropriate precoding matrix for precoding the encoded and modulated symbol streams received from the symbol encoder/modulator 46. The precoded symbol stream may then be upconverted and processed by a space-time mapping block 34 which may use a space-time mapping matrix developed according to the principles described herein based on the number of symbol streams to be sent simultaneously and the number of transmission antennas 18 to be used. The output of the space-time mapping block 34 is then transmitted via the receiver antennas $18_1$-$18_N$ to, for example, the transmitter 12, thereby implementing the reverse link. The transmitter 12 may implement a matrix equalizer 25 and symbol demodulator/decoder 26 for receiving, demodulating and decoding signals transmitted from the receiver or terminal 16 to the transmitter or base station 16 over the reverse channel.

The matrix equalizer 25 and the demodulator/decoder unit 26 within the transmitter 12 operate similarly to the matrix equalizer 35 and the demodulator/decoder unit 36 of the receiver 16 to demodulate and decode the symbol streams transmitted by the receiver 16 to produce the recovered signals $RR_1$-$RR_m$. Here again, the matrix equalizer 25 may process the received signals in any known manner to enhance the separation and therefore the reception of the various symbol streams transmitted by the antennas $18_1$-$18_M$.

As mentioned above, the transmitter or base station controller 20 selects an appropriate precoding matrix from the variable size codebook stored in the memory 21 based on a feedback signal received from the receiver 16. In order to determine the appropriate codebook size and select the best precoding matrix for the channel conditions, the receiver 16 includes the codebook/matrix selection block 41. When the receiver 16 receives signals from the transmitter 12, such as the known test signal $Cx_1$, the codebook/matrix selection block 41 (or the controller 40) measures channel state information relating the characteristics and quality of the wireless channel between the transmitter and the receiver. The channel state information may comprise a matrix of complex channel values that take into account the contributions of all combinations of the transmitting antennas $14_1$-$14_N$ and the receiving antennas $18_1$-$18_M$. The channel state information measured by the codebook/matrix selection block 41 may include, for example, the channel gain and phase delay characteristics between each pair of transmit and receive antennas. The codebook/matrix selection block 41 may also measure channel quality, in the form of (SINR), a signal-to-noise-ratio (SNA), or some other measure of the channel quality.

The codebook/matrix selection block 41 then evaluates the channel state information using various criteria to select first the most appropriate code book to use given the measured channel conditions, and then a particular precoding matrix from the selected codebook for precoding signals. The identity of or size of the selected codebook along with the identity of the selected precoding matrix is then fed back to the transmitter 12 so that the transmitter controller 20 may select the proper precoding matrix from the appropriate size codebook stored in the memory 21. The selected codebook and the selected precoding matrix within the selected codebook may be fed back to the transmitter 12 via the reverse transmission channel, or over another dedicated feedback channel (not shown).

A selected precoding matrix may be specified by identifying a particular size codebook from which the precoding matrix is to be selected and a specific precoding matrix within the identified codebook. For example, in an embodiment in which four different sized codebooks are employed (e.g. codebooks containing 64, 32, 16 and 8 precoding matrices respectively), a minimum of 2 bits are required to identify one of the four different codebooks. An additional six bits are required to identify a particular precoding matrix within the largest codebook, if the codebook having 64 precoding matrices is selected. If the codebook having 32 matrices is selected, an additional 5 bits are required to specify a particular precoding matrix. Four additional bits are required to identify a particular precoding matrix if the codebook having 16 matrices is specified, and only 3 additional bits are required to identify a particular precoding matrix if the smallest codebook having 8 precoding matrices is employed. If the channel quality is poor, it is unlikely that system throughput will significantly improved by using a precoding matrix from one of the larger codebooks. In this case it may not be worth the price in additional channel overhead to use a precoding matrix from one of the larger codebooks and a smaller codebook may be selected. If channel conditions are better, however, and it is likely that channel throughput will be improved using a larger codebook by an amount significantly greater than the amount of channel capacity consumed by the additional overhead required to identify a precoding matrix within the larger codebook, the improved channel throughput associated with selecting a precoding matrix from the larger codebook may justify the increased cost in channel overhead.

When employing a variable size codebook in a MIMO wireless communication system, objective criteria may be established for selecting the appropriate size codebook. Since there is a tradeoff between increased system throughput and increased channel overhead associated with using a larger codebook, one appropriate codebook selection criterion is to compare the expected channel throughput associated with a particular size codebook against the cost in feedback channel overhead associated with using that size codebook. In a MIMO wireless communication system, channel throughput is highly dependent on the transmission quality of the wireless channel. The receiver may measure the SNR or the SINR or some measure of the channel quality from the signals received by the receiving antennas $18_1$-$18_M$. The codebook/matrix selection block 41 may then calculate an expected throughput for each of the different sized codebooks available for precoding signals to be transmitted to the receiver 16. A ratio may be calculated for each of the different sized codebooks comparing the expected throughput associated with each codebook to the corresponding cost in additional overhead. Whichever codebook offers the highest ratio of improved channel performance to overhead cost will be selected. Of course, other codebook selection criteria may also be used. For example, a series of SNR or SINR thresholds may be established. The codebook size may be selected based on where the measured SNR or SINR falls in relation to the established thresholds. When the measured SNR or SINR is below a first threshold the smallest available codebook may be selected. If the measured SNR or SINR is greater than or equal to the first threshold value, but less than the second threshold value, the next larger available codebook may be selected, and so on until there is a proper sized codebook identified for every possible set of channel conditions.

Once a particular size codebook has been selected the codebook matrix selection block 41 may select a particular precoding matrix from the selected codebook. The precoding matrix may be selected in a manner similar to the process of selecting the size of the codebook. Some objective criteria, such as the maximum sum throughput, may be defined and calculated for each precoding matrix within the selected codebook. The precoding matrix that produces the highest maximum sum throughput (or some other objective measure) may then be selected for precoding the symbols to be transmitted from the transmitter to the receiver.

Figure 2:
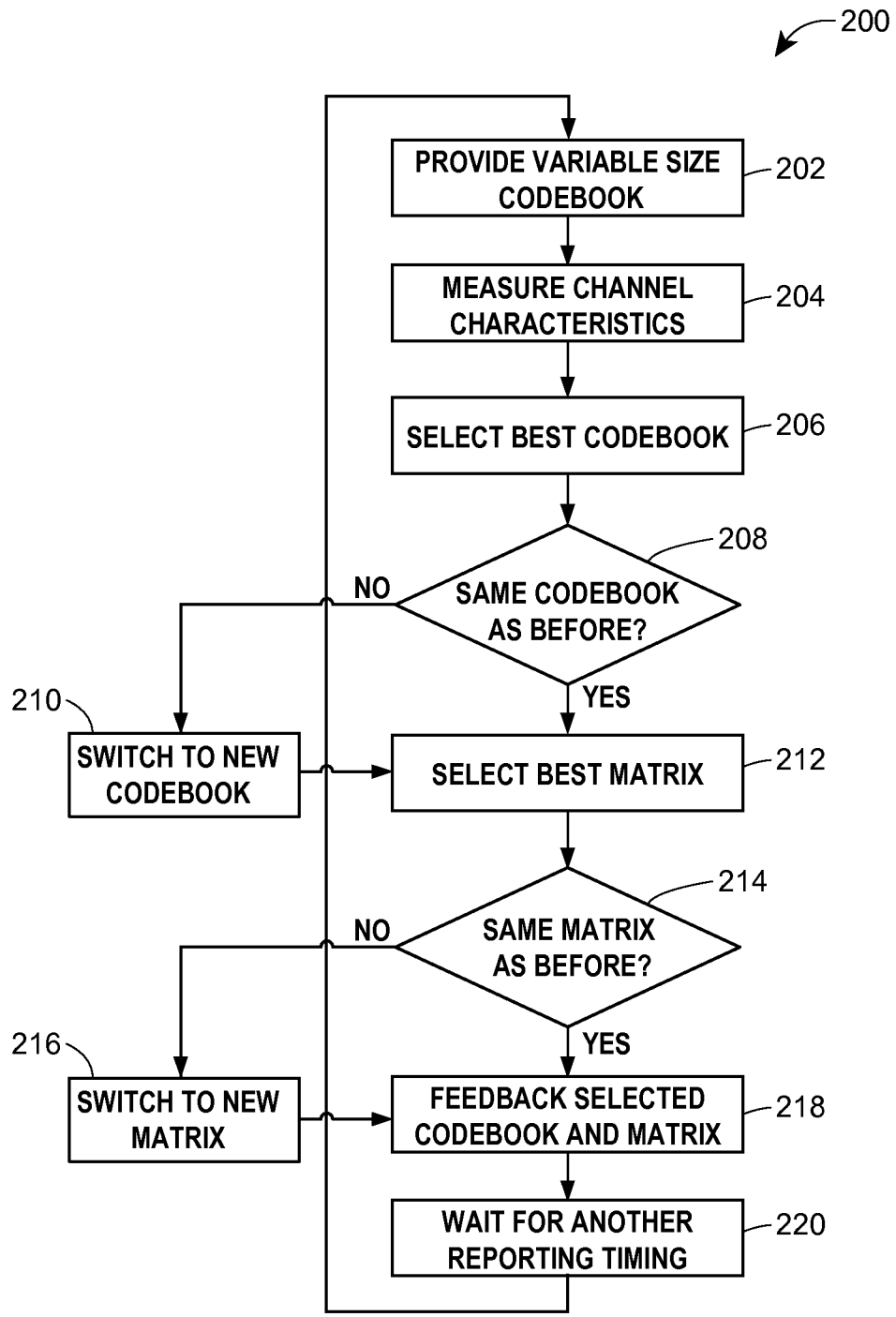
FIG. 2 is a flow chart showing a method of selecting a codebook size and identifying a precoding matrix form within a codebook of the selected size based on codebook size and matrix selection criteria.

FIG. 2 is a flowchart illustrating the process of selecting a precoding matrix in a MIMO wireless communication system employing a variable size codebook. A first step 202 is to provide a variable size codebook that includes a plurality of precoding matrices that may be employed to precode signals transmitted from a wireless transmitter to a wireless receiver within a MIMO wireless communication system. As described above, the variable sized codebook may comprise a single large codebook having a large number of precoding matrices from which smaller codebooks may be defined by selecting smaller subsets of the precoding matrices found in the larger codebook. Alternatively, the variable sized codebook may comprise a collection of differently sized codebooks, each adapted for different channel conditions.

Next, at block 204, the process of applying a variable sized codebook to a MIMO wireless communication channel calls for measuring one or more characteristics of the wireless communication channel. At least one of the measured characteristics relates to codebook size and precoding matrix selection criteria. The codebook size criteria are employed to determine the size or identity of a particular codebook from which a precoding matrix may be selected for precoding wireless transmissions from the transmitter to the receiver in the MIMO wireless communication system. The measured communication channel characteristics may comprise, for example, the SNR, SINR, or some other measure of the channel quality. Once the channel characteristics have been measured, the process next calls for selecting the best codebook at block 206. This step requires evaluating predefined codebook selection criteria relating to the state of the wireless communication channel. For example, the criteria for selecting the size of the codebook from which a precoding matrix will be selected may include comparing the cost in channel overhead associated with each available codebook to the corresponding expected gain in system throughput associated with each available codebook. Typically, the expected throughput associate with each of the different size codebooks will be heavily influenced by the measured state of the communication channel. The codebook that offers the greatest expected throughput under the measured channel conditions for the least additional cost in channel overhead may be selected.

Once the best codebook for the given channel conditions has been selected, a determination is made at decision block 208 whether the selected codebook is the same codebook that was used for precoding a previous transmission. If the codebook is the same, the process continues directly to block 212 where the best precoding matrix for the measured channel conditions is selected. If the selected codebook is not the same as the codebook used for precoding the previous transmission, the process switches to the new codebook at block 210 before proceeding to select the best precoding matrix from the new codebook at block 212.

At block 212, predefined matrix selection criteria are applied to determine the best precoding matrix in the selected codebook for precoding wireless transmissions given the measured channel conditions. The best matrix selection criteria may comprise, for example, calculating the maximum sum throughput for each matrix in the selected codebook, and selecting the matrix which provides the greatest throughput given the measured channel characteristics.

Once the precoding matrix has been selected at 212, a determination is made at decision block 214 whether the selected precoding matrix is the same as a precoding matrix employed to precode a previous transmission. If so, the process continues directly to block 218 where an index identifying the selected codebook and the selected precoding matrix is fed back to the transmitter so that the transmitter may access the identified codebook and the identified precoding matrix within the identified codebook in order to precode a wireless transmission to be sent from the transmitter to the receiver in the MIMO wireless communication system. If, however, it is determined a decision block 214 that the selected precoding matrix is not the same precoding matrix that was employed on the previous transmission, the process switches to the new precoding matrix at block 216 before proceeding to feed back the identity selected codebook and the selected matrix to the transmitter at block 218.

Once the selected codebook and precoding matrix have been selected and their identities fed back to the transmitter for precoding a next wireless transmission, the process waits for the next reporting period at block 220. The process may be adapted to re-evaluate channel conditions and select a codebook and precoding matrix at certain predefined rate, or after a predefined period of time, after a certain number of transmissions or based on some other criteria. In any case, at the beginning of the next reporting period the process returns to block 202 and repeats.

Variable size codebook techniques such as described above may be utilized in any type of wireless communication system including, for example, ones used in wireless computer systems such as those implemented via a wireless local area network (WLAN) or a wide area wireless network (e.g., WiMax), internet, cable and satellite based communication systems (such as internet, data, video and voice communication systems), wireless telephone systems (including cellular phone systems, voice over internet protocol (VoIP) systems, home-based wireless telephone systems, etc.) Referring now to FIGS. 3A-3H, various exemplary implementations of the present invention are shown.

Figure 3A:
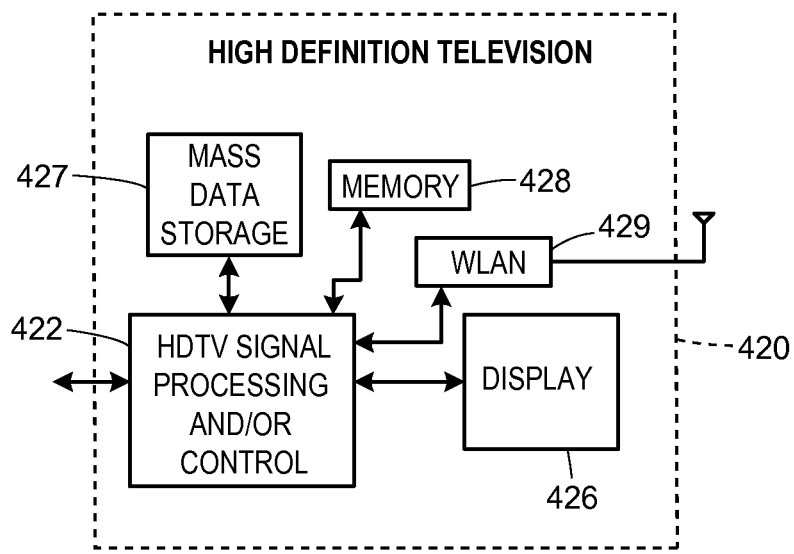
FIGS. 3A-3F illustrate examples of various different devices in which a wireless communication system implementing a variable size codebook described herein may be used.
Figure 3B:
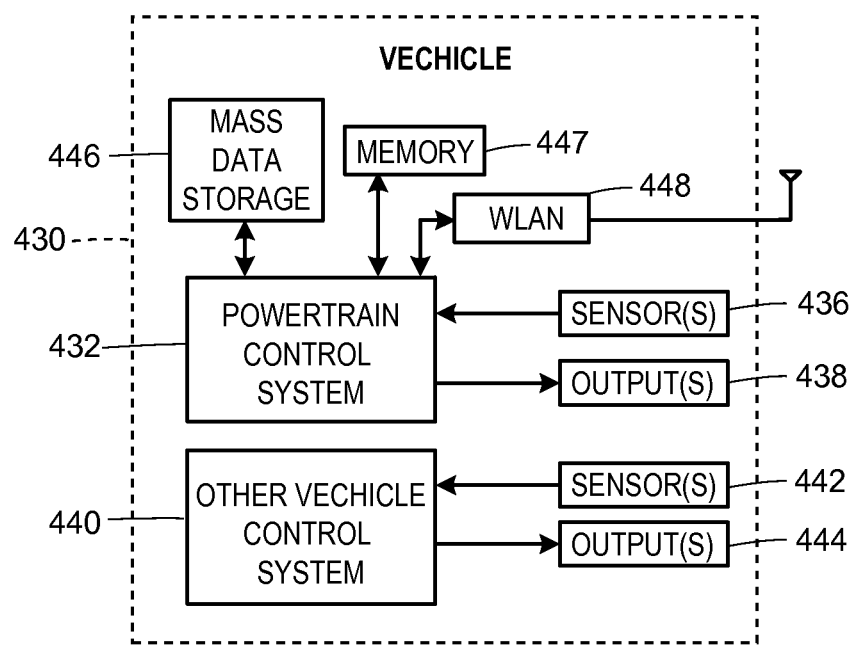
Figure 3C:
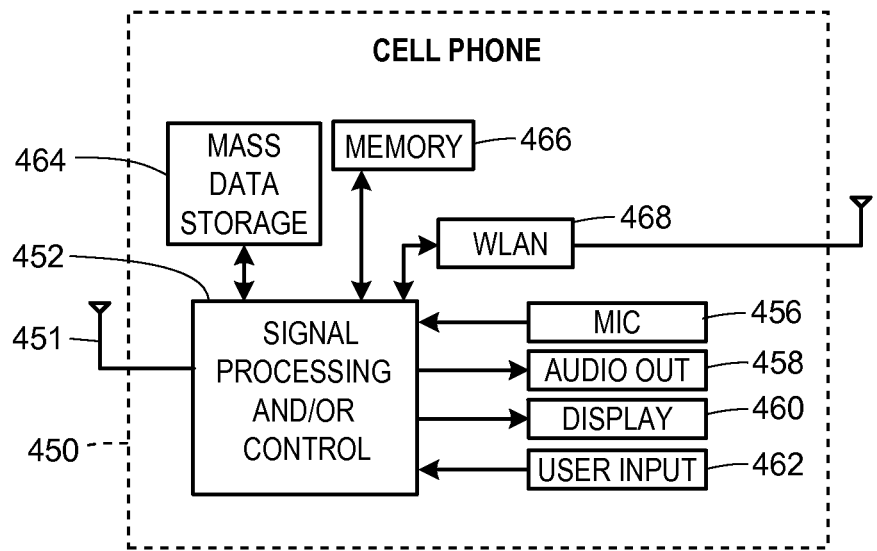

Referring now to FIG. 3A, variable size codebooks may be utilized in a high definition television (HDTV) 420 which may include either or both signal processing and/or control circuits, which are generally identified in FIG. 3C at 422, a WLAN network interface 429 and/or mass data storage 427 of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required. Variable size codebook techniques may be utilized in the signal processing circuit and/or control circuit 422 and/or the WLAN network interface 429, for example.

HDTV 420 may communicate with mass data storage 427 that stores data in a nonvolatile manner such as optical and/or magnetic storage devices such as a hard disk drive (HDD) or a digital versatile disk (DVD) drive. The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via the WLAN network interface 429 which may implement the beamforming techniques described above.

Referring now to FIG. 3B, the present invention may be used in conjunction with a control system of a vehicle 430 having a WLAN network interface 448 and/or mass data storage 446. In some implementations, may be used within a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, braking parameters, and/or other control signals.

Variable size codebook techniques may also be utilized in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices, for example, a hard disk drive (HDD) and/or a DVD drive. The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via the WLAN network interface 448 which may implement the beamforming techniques described above. The control system 440 may also include mass data storage, memory and/or a WLAN network interface (all not shown). Variable size codebook techniques may be utilized on the WLAN network interface 448 of the powertrain control system and/or the WLAN network interface of the control system 440.

Referring now to FIG. 3C, variable size codebook techniques may be embodied in a cellular phone 450 that may include one or more cellular antennas 451, either or both signal processing and/or control circuits, which are generally identified in FIG. 3C at 452, a WLAN network interface 468 and/or mass data storage 464 of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices, for example, a hard disk drive (HDD) and/or a DVD drive. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via the WLAN network interface 468. Variable size codebook techniques may be utilized on the WLAN network interface 468 and/or the signal processing and/or control circuits 452.

Figure 3D:
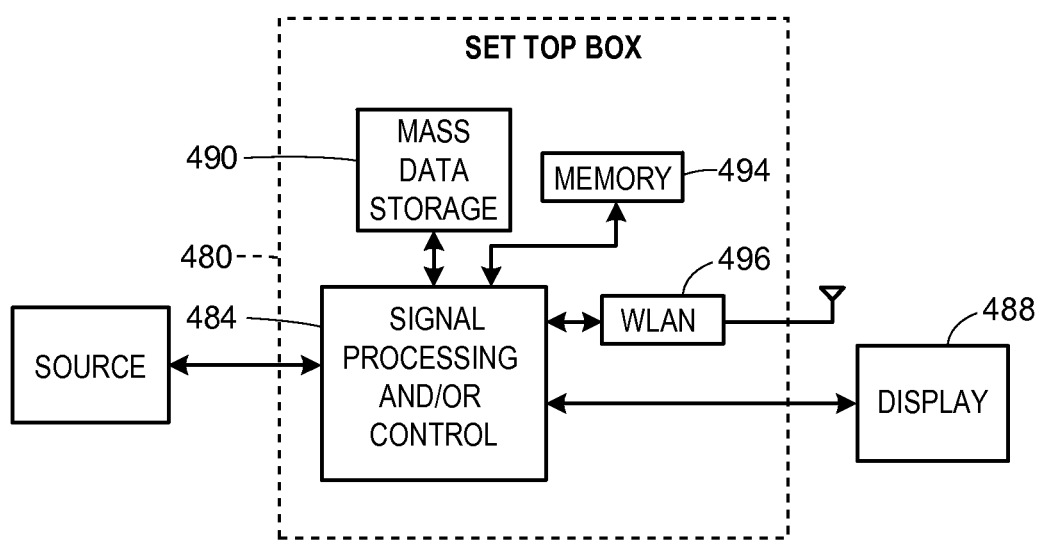

Referring now to FIG. 3D, the variable size codebook techniques may be embodied in a set top box 480 including either or both signal processing and/or control circuits, which are generally identified in FIG. 3D at 484, a WLAN network interface 496 and/or mass data storage 490 of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices, for example, a hard disk drive HDD and/or a DVD drive. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via the WLAN network interface 496 which may implement the beamforming techniques described herein. Variable size codebook techniques may be utilized in the signal processing and/or control circuits 484 and/or the WLAN network interface 496.

Figure 3E:
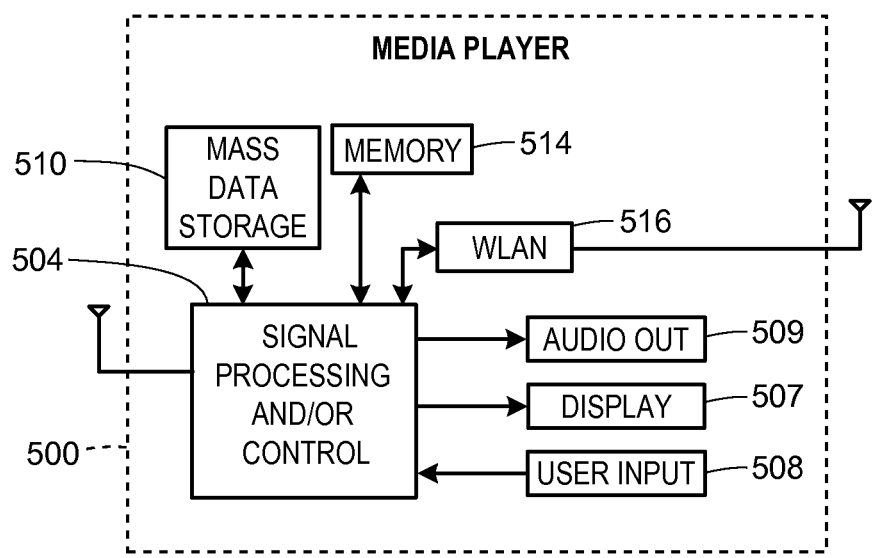

Referring now to FIG. 3E, the variable size codebook techniques may be embodied in a media player 500. The variable size codebook techniques may be implemented in either or both the signal processing and/or control circuits, which are generally identified in FIG. 3E at 504, and a WLAN network interface 516 and/or mass data storage 510 of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices, for example, a hard disk drive (HDD) and/or a DVD drive. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via the WLAN network interface 516 which may implement the beamforming techniques described herein. Still other implementations in addition to those described above are contemplated.

Figure 3F:
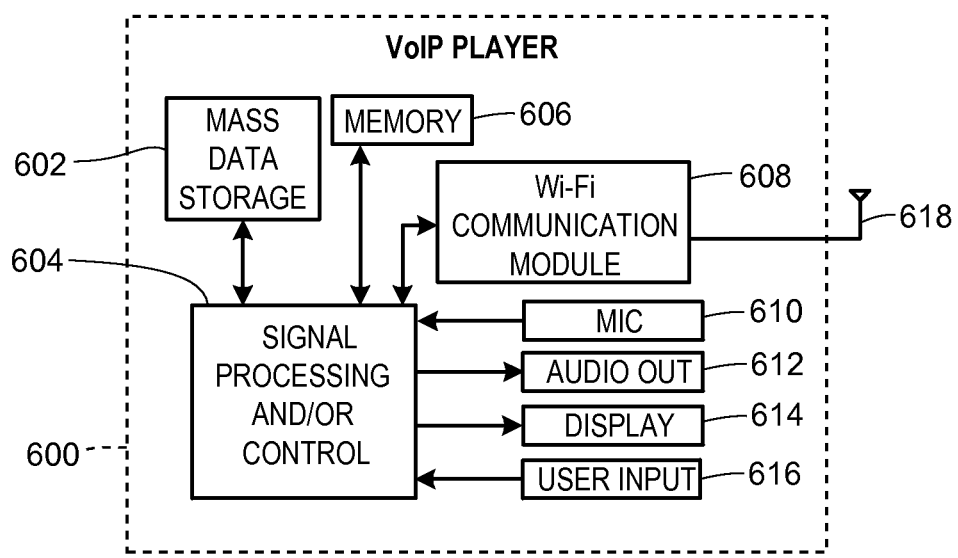

Referring to FIG. 3F, the variable size codebook techniques may be embodied in a Voice over Internet Protocol (VoIP) phone 600 that may include one or more antennas 618, either or both signal processing and/or control circuits, which are generally identified in FIG. 3F at 604, and a wireless interface and/or mass data storage 602 of the VoIP phone 600. In some implementations, VoIP phone 600 includes, in part, a microphone 610, an audio output 612 such as a speaker and/or audio output jack, a display monitor 614, an input device 616 such as a keypad, pointing device, voice actuation and/or other input devices, and a Wireless Fidelity (Wi-Fi) communication module 608. Signal processing and/or control circuits 604 and/or other circuits (not shown) in VoIP phone 600 may process data, perform coding and/or encryption, perform calculations, format data and/or perform other VoIP phone functions.

VoIP phone 600 may communicate with mass data storage 602 that stores data in a nonvolatile manner such as optical and/or magnetic storage devices, for example, a hard disk drive (HDD) and/or a DVD drive. The HDD may be a mini HDD that includes one or more platters having a diameter that is smaller than approximately 1.8". VoIP phone 600 may be connected to memory 606, which may be a RAM, ROM, low latency nonvolatile memory such as flash memory and/or other suitable electronic data storage. VoIP phone 600 is configured to establish communications link with a VoIP network (not shown) via Wi-Fi communication module 608 which may implement the beamforming techniques described herein. Variable size codebook techniques may be employed in either or both the signal processing and/or control circuits 604 and the Wi-Fi communication module 608.

Moreover, while the present invention has been described with reference to specific examples, which are intended to be illustrative only and not to be limiting of the invention, changes, additions and/or deletions may be made to the disclosed embodiments without departing from the spirit and scope of the invention. For example, one or more steps of the method described above may be performed in a different order or concurrently to achieve desirable results.

What is claimed is:

1. A tangible, non-transitory, computer-readable medium storing instructions that, when executed by one or more processors in a first communication device, cause the one or more processors to:
   calculate an expected throughput for each of a plurality of different codebook sizes given a measured characteristic of a wireless communication channel between the first communication device and a second communication device, wherein each of the plurality of different codebook sizes corresponds to a different number of precoding matrices;
   select a size of a codebook from the plurality of different codebook sizes using the expected throughput for each of the plurality of different codebook sizes given the measured characteristic of the wireless communication channel, wherein the codebook of the selected codebook size includes precoding matrices for precoding signals that are to be wirelessly transmitted;
   select, based on matrix selection criteria, a best matrix from a codebook of the selected codebook size; and
   cause a transmitter to transmit an indicator of the selected matrix to the second communication device.

2. The tangible, non-transitory, computer-readable medium of claim 1, wherein the computer-readable medium stores instructions that, when executed by one or more processors in the first communication device, cause the one or more processors to:
   develop codebook size selection criteria using the expected throughput for each of the plurality of different codebook sizes given the measured characteristic of the wireless communication channel; and
   select the codebook size using the codebook size selection criteria.

3. The tangible, non-transitory, computer-readable medium of claim 2, wherein the computer-readable medium stores instructions that, when executed by one or more processors in the first communication device, cause the one or more processors to:
   develop the codebook size selection criteria at least by calculating, for each of the plurality of different codebook sizes, a ratio of (i) a respective communication channel overhead consumed by a codebook of the codebook size to (ii) the respective expected throughput given the measured characteristic of the communication channel; and
   select the codebook size at least by selecting the codebook size for which the ratio is smallest.

4. The tangible, non-transitory, computer-readable medium of claim 1, wherein the instructions, when executed by one or more processors in the first communication device, cause the one or more processors to:
   select the best matrix at least by
      calculating maximum sum throughputs for precoding matrices in a codebook of the selected size, and
      selecting a precoding matrix with a highest maximum sum throughput.

5. The tangible, non-transitory, computer-readable medium of claim 1, wherein the instructions, when executed by one or more processors in the first communication device, cause the one or more processors to:
   calculate the expected throughput for each of the plurality of different codebook sizes given a measured signal to interference plus noise ratio (SINR).

6. The tangible, non-transitory, computer-readable medium of claim 1, wherein:
   the plurality of different codebook sizes includes at least a first codebook size and a second codebook size;
   the instructions, when executed by one or more processors in the first communication device, cause the one or more processors to select the codebook size at least by
      selecting a best matrix from a first codebook comprising a first plurality of precoding matrices when the first codebook size is selected, and
      selecting a best matrix from a second codebook comprising a second plurality of precoding matrices when the second codebook size is selected; and
   the second plurality of precoding matrices consists of a subset of the first plurality of precoding matrices.

7. A method, implemented in a first communication device, of selecting a codebook for precoding a wireless transmission signal to be transmitted by a second communication device, the method comprising:

measuring, in the first communication device, a characteristic of a wireless communication channel between the first communication device and the second communication device;

calculating, in the first communication device, an expected throughput for each of a plurality of codebooks given the measured characteristic of the wireless communication channel, wherein codebooks among the plurality of codebooks have different numbers of precoding matrices;

selecting, in the first communication device, one codebook from the plurality of codebooks using the expected throughput for each of the plurality of codebooks given the measured characteristic of the wireless communication channel;

selecting, in the first communication device and based on matrix selection criteria, a matrix from the one codebook; and transmitting an indicator of the selected matrix from the first communication device to the second communication device.

8. The method of claim 7, wherein selecting the codebook comprises:
developing codebook selection criteria using the expected throughput for each of the plurality of codebooks given the measured characteristic of the wireless communication channel; and
selecting the codebook using the codebook selection criteria.

9. The method of claim 8, wherein:
developing the codebook selection criteria comprises calculating, for each of the plurality of codebooks, a ratio of (i) a respective communication channel overhead consumed by a codebook to (ii) the respective expected throughput given the measured characteristic of the communication channel; and
selecting the codebook comprises selecting the codebook for which the ratio is smallest.

10. The method of claim 7, wherein selecting the matrix comprises:
calculating maximum sum throughputs for precoding matrices in the selected codebook; and
selecting, from the selected codebook, a precoding matrix with a highest maximum sum throughput.

11. The method of claim 7, wherein:
measuring the characteristic of the wireless communication channel comprises measuring a signal to interference plus noise ratio (SINR); and
calculating an expected throughput for each of the plurality of codebooks given the measured characteristic of the wireless communication channel includes calculating an expected throughput for each of the plurality of codebooks given the measured SINR.

12. The method of claim 7, wherein:
the plurality of codebooks includes at least i) a first codebook comprising a first plurality of precoding matrices, and ii) a second codebook comprising a second plurality of precoding matrices;
selecting a matrix from the selected codebook includes selecting the matrix from the first plurality of precoding matrices when the first codebook is selected, and
selecting the matrix from the second plurality of precoding matrices when the second codebook size is selected; and
the second plurality of precoding matrices consists of a subset of the first plurality of precoding matrices.

13. The method of claim 7, wherein selecting the codebook comprises selecting the codebook from a plurality of fixed-size codebooks each containing a different number of precoding matrices.

14. An apparatus, comprising:
channel state information measuring circuitry configured to measure a characteristic of a wireless communication channel;
a codebook selector configured to
calculate an expected throughput for each of a plurality of codebooks given the measured characteristic of the wireless communication channel, wherein codebooks among the plurality of codebooks have different numbers of precoding matrices,
select a codebook from the plurality of codebooks using the expected throughput for each of the plurality of codebooks given the measured characteristic of the wireless communication channel, and
select a matrix from the selected codebook based on matrix selection criteria, wherein the selected codebook includes precoding matrices for precoding signals that are to be wirelessly transmitted,
wherein the codebook selector is implemented on an integrated circuit device; and
a transmitter configured to transmit an indicator of the selected matrix to a communication device.

15. The apparatus of claim 14, wherein the codebook selector is configured to:
develop codebook selection criteria using the expected throughput for each of the plurality of codebooks given the measured characteristic of the wireless communication channel; and
select the codebook using the codebook selection criteria.

16. The apparatus of claim 15, wherein the codebook selector is configured to:
develop the codebook selection criteria at least by calculating, for each of the plurality of codebooks, a ratio of (i) a respective communication channel overhead consumed by the codebook to (ii) the respective expected throughput given the measured characteristic of the communication channel; and
select the codebook at least by selecting the codebook for which the ratio is smallest.

17. The apparatus of claim 14, wherein the codebook selector is configured to select the matrix at least by:
calculating maximum sum throughputs for precoding matrices in the selected codebook; and
selecting, from the selected codebook, a precoding matrix with a highest maximum sum throughput.

18. The apparatus of claim 14, wherein:
the channel state information measuring circuitry is configured to measure a signal to interference plus noise ratio (SINR) corresponding to received wireless transmissions; and
the codebook selector is configured to calculate the expected throughput for each of the plurality of codebooks given the measured SINR.

19. The apparatus of claim 14, wherein:
the plurality of codebooks includes at least i) a first codebook comprising a first plurality of precoding matrices, and ii) a second codebook comprising a second plurality of precoding matrices;
the codebook selector is configured to select the matrix at least by
selecting the matrix from the first codebook when the first codebook is selected, and selecting the matrix from the second codebook when the second codebook is selected; and the second plurality of precoding matrices consists of a subset of the first plurality of precoding matrices.

20. The apparatus of claim 14, wherein the codebook selector is configured to select the codebook from a plurality of fixed-size codebooks each containing a different number of precoding matrices.

\* \* \* \* \*